US009459165B2

United States Patent
Hama et al.

(10) Patent No.: US 9,459,165 B2
(45) Date of Patent: Oct. 4, 2016

(54) SENSOR UNIT, TORQUE DETECTOR, AND ELECTRIC POWER STEERING DEVICE

(71) Applicant: Showa Corporation, Gyoda-shi (JP)

(72) Inventors: Yohei Hama, Haga-gun (JP); Hiroyuki Muto, Haga-gun (JP); Kiyokazu Okado, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 51 days.

(21) Appl. No.: 14/520,898

(22) Filed: Oct. 22, 2014

(65) Prior Publication Data

US 2015/0276519 A1    Oct. 1, 2015

(30) Foreign Application Priority Data

Mar. 27, 2014    (JP) .................. 2014-067235

(51) Int. Cl.
*G01L 3/02*    (2006.01)
*G01L 3/10*    (2006.01)
*G01L 5/22*    (2006.01)

(52) U.S. Cl.
CPC ............... *G01L 3/101* (2013.01); *G01L 3/104* (2013.01); *G01L 5/221* (2013.01); *H02K 11/24* (2016.01)

(58) Field of Classification Search
CPC .... G01L 3/101; G01L 3/104; H02K 11/0042
USPC .................. 73/862.193, 862.331–862.335
See application file for complete search history.

(56) References Cited

U.S. PATENT DOCUMENTS

| 2005/0172732 | A1* | 8/2005 | Feng ...................... G01D 5/145 73/862.332 |
| 2012/0073386 | A1* | 3/2012 | McDonald ............. G01L 3/104 73/862.09 |
| 2013/0133437 | A1* | 5/2013 | Woo ........................ G01L 3/104 73/862.335 |
| 2013/0305843 | A1* | 11/2013 | Lee .......................... G01L 3/104 73/862.325 |
| 2014/0123770 | A1* | 5/2014 | Lee .......................... G01L 3/101 73/862.193 |

FOREIGN PATENT DOCUMENTS

| EP | 2600129 A | 6/2013 |
| JP | 2010-019718 A | 1/2010 |
| JP | 2013-195333 A | 9/2013 |

OTHER PUBLICATIONS

European Search Report mailed May 29, 2015 for the corresponding European Application No. 14190427.6.

* cited by examiner

*Primary Examiner* — Max Noori
(74) *Attorney, Agent, or Firm* — Leason Ellis LLP

(57) ABSTRACT

A sensor unit includes a collector and a sensor housing. The collector faces a stator guiding a magnetic flux, with a void between the collector and the stator, and collectively attracts the magnetic flux guided by the stator. The sensor housing has a wall covering outside of the collector, and holds the collector. A clearance is formed between an opposite surface of the collector to a surface thereof facing the stator, and the wall of the sensor housing.

10 Claims, 8 Drawing Sheets

SENSOR UNIT, TORQUE DETECTOR, AND ELECTRIC POWER STEERING DEVICE

CROSS-REFERENCE TO RELATED APPLICATIONS

This application is based on and claims priority under 35 USC 119 from Japanese Patent Application No. 2014-067235 filed on Mar. 27, 2014, the entire content of which is incorporated herein by reference.

BACKGROUND OF THE INVENTION

1. Technical Field

The present invention relates to a sensor unit, a torque detector, and an electric power steering device.

2. Related Art

In order to detect steering torque generated in a shaft of an electric power steering device of a vehicle, a torque detector is used. The torque detector includes a permanent magnet that is fixed to one of an input shaft and an output shaft connected by a torsion bar, a stator that is fixed to the other one of the shafts, and guides a magnetic flux according to a torsion angle between the one shaft and the other shaft, and a sensor unit that converts the magnetic flux guided by the stator into an electric signal, to output the electric signal.

The permanent magnet, and a stator unit are covered with a shaft side housing.

The sensor unit includes a collector that faces the stator, and collectively attracts the magnetic flux guided by the stator, a magnetometric sensor that converts the magnetic flux collectively attracted by the collector into an electric signal, to output the electric signal, and a sensor housing that has a peripheral wall which covers the outside of these collector and magnetometric sensor to hold the collector and the magnetometric sensor therein, and is fixed to the shaft side housing (see, Patent Literature 1 (JP-A-2013-195333)).

The collector is held by the sensor housing so as to form a proper clearance between the collector and the stator when the sensor housing is fixed to the shaft side housing.

SUMMARY OF THE INVENTION

The torque detector including the sensor unit is mounted in a steering mechanism of the vehicle, and therefore is arranged in an engine room of the vehicle. The engine room is likely to become a high temperature due to heat generated mainly by an engine, and the sensor unit is also exposed to this heat.

The sensor housing of the sensor unit is made of resin, and therefore is often influenced by heat. When the peripheral wall of the sensor housing is deformed due to the influence of the heat, and the outer wall presses the collector in a direction of the stator, the clearance between the collector and the stator is reduced, the magnetic flux collectively attracted from the stator by the collector becomes different from a magnetic flux collectively attracted in the proper clearance. This may influence detection accuracy.

The invention has been made in view of the above circumstances, and an object of the invention is to provide a sensor unit, a torque detector, and an electric power steering device in which an influence on the collector by heat can be prevented or suppressed even when the sensor housing receives the heat.

An aspect of the present invention provides a sensor unit including: a collector that faces a stator guiding a magnetic flux, with a void between the collector and the stator, and collectively attracts the magnetic flux guided by the stator; and a sensor housing that has a wall covering outside of the collector, and holds the collector, in which a clearance may be formed between an opposite surface of the collector to a surface thereof facing the stator, and the wall of the sensor housing.

In the sensor unit, the clearance may be formed in a range except both ends in a longitudinal direction of the collector.

In the sensor unit, a part except parts, which are in contact with the both ends of the collector, of the wall may be formed in a recessed shape, which results in forming the clearance.

In the sensor unit, a part except the both ends of the collector may be formed by bending in a direction away from the wall, which results in forming the clearance.

Additionally, another aspect of the present invention provides a torque detector including: a magnet that is fixed to one shaft of two shafts which relatively rotate and are coaxially arranged; a stator that is fixed to the other shaft of the two shafts, and guides a magnetic flux according to a torsion angle between the one shaft and the other shaft; and a sensor unit that includes a collector that faces the stator, with a void between the collector and the stator, and collectively attracts the magnetic flux guided by the stator, and a sensor housing that has a wall covering outside of the collector, and holds the collector, in which a clearance is formed between an opposite surface of the collector to a surface thereof facing the stator, and the wall of the sensor housing.

Additionally, another aspect of the present invention provide an electric power steering device including: a torque detector detecting torque that includes: a magnet that is fixed to one shaft of two shafts which relatively rotate and are coaxially arranged; a stator that is fixed to the other shaft of the two shafts, and detects a magnetic flux according to a torsion angle between the one shaft and the other shaft; and a sensor unit that includes a collector that faces the stator, with a void between the collector and the stator, and collectively attracts the magnetic flux detected by the stator, and a sensor housing that has a wall covering outside of the collector, and holds the collector; an electric motor that assists rotation of one of the one shaft and the other shaft; and a controller that controls driving of the electric motor on the basis of a result detected by the torque detector, in which a clearance is formed between an opposite surface of the collector to a surface thereof facing the stator, and the wall of the sensor housing.

According to the sensor unit, an influence on the collector by heat can be prevented or suppressed even when the sensor housing receives the heat.

According to the torque detector, an influence on the collector by heat can be prevented or suppressed even when the sensor housing receives the heat.

According to the electric power steering device, an influence on the collector by heat can be prevented or suppressed even when the sensor housing receives the heat.

DETAILED DESCRIPTION OF THE INVENTION

Hereinafter, an embodiment of an electric power steering device, a torque detector, and a sensor unit according to the present invention will be described with reference to the figures.

Schematic Description of Electric Power Steering Device 100

Figure 1:
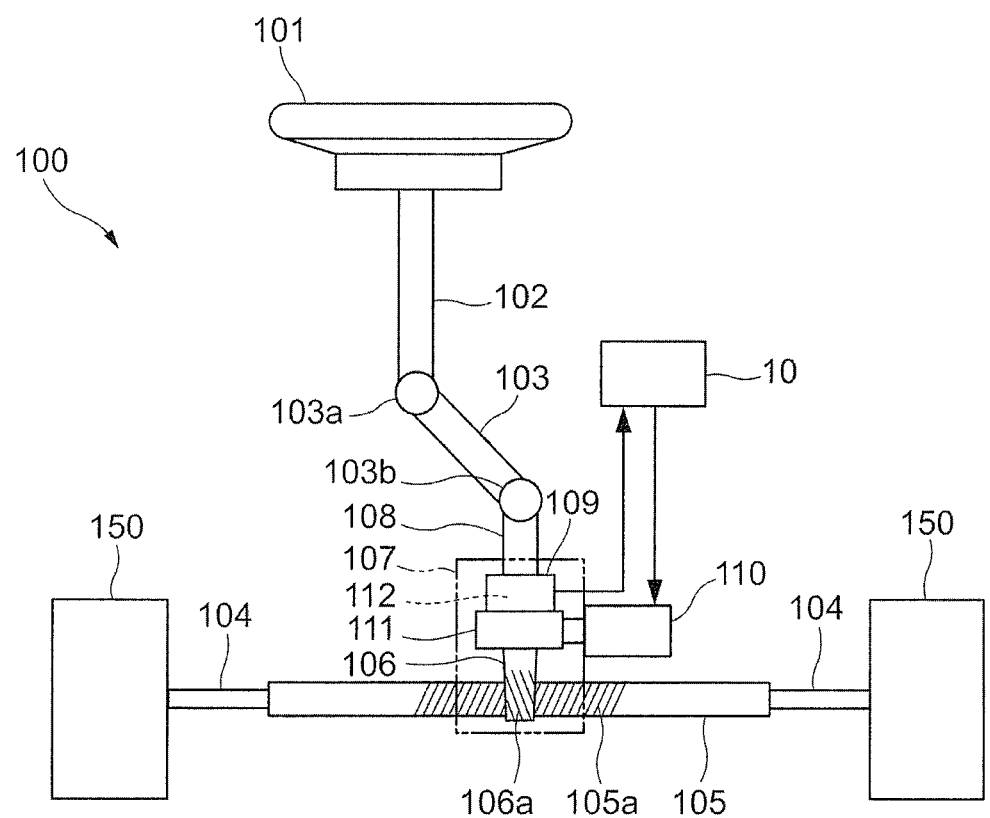
FIG. 1 is a diagram showing a schematic configuration of an electric power steering device according to an embodiment of the present invention.

FIG. 1 is a diagram showing a schematic configuration of an electric power steering device 100 according to an embodiment of the present invention. The electric power steering device 100 (hereinafter, sometimes simply referred to as a "steering device 100") is a steering device for arbitrarily changing a traveling direction of a vehicle. In this embodiment, a configuration in which the steering device is applied to an automobile is exemplified.

The steering device 100 includes a steering wheel 101 that is operated by a driver, and a steering shaft 102 that is provided integrally with the steering wheel 101. The steering shaft 102 and the upper connection shaft 103 are connected via a universal joint 103a, and the upper connection shaft 103 and a lower connection shaft 108 (one shaft) are connected via a universal joint 103b.

The steering device 100 includes respective tie rods 104 that are connected to right and left front wheels 150 serving as rolling wheels, and a rack shaft 105 that is connected to the tie rods 104. The steering device 100 includes a pinion 106a that configures a rack and pinion mechanism together with a rack tooth 105a formed in the rack shaft 105. The pinion 106a is formed on the lower end of a pinion shaft 106 (the other shaft).

The steering device 100 has a steering gear box 107 that houses the pinion shaft 106. The pinion shaft 106 is coaxially connected to the lower connection shaft 108 via a torsion bar 112 in the steering gear box 107, and the pinion shaft 106 and the lower connection shaft 108 relatively rotate in accordance with the torsion of the torsion bar 112. The torsion of the torsion bar 112 corresponds to steering torque T that is applied to the steering wheel 101.

In the steering gear box 107, a torque sensor 109 as an embodiment of a torque detector according to the present invention, which detects the steering torque T applied to the steering wheel 101 on the basis of a relative rotation angle between the lower connection shaft 108 and the pinion shaft 106, is provided.

The steering device 100 further has an electric motor 110 that is supported by the steering gear box 107, and a speed reduction mechanism 111 that reduces the speed of the driving force of the electric motor 110 to transmit the reduced speed to the pinion shaft 106. Furthermore, the steering device 100 includes a controller 10 that controls the operation of the electric motor 110. To the controller 10, an output value (result detected by the torque sensor 109) of the above torque sensor 109 is input.

In the steering device 100 configured as described above, the torque sensor 109 detects the steering torque T applied to the steering wheel 101, the controller 10 controls the driving of the electric motor 110 on the basis of the detected steering torque T, and torque generated by the electric motor 110 is transmitted to the pinion shaft 106. Consequently, the torque generated by the electric motor 110 assists steering effort of the driver that is applied to the steering wheel 101.

Configuration of Torque Sensor 109

Figure 2:
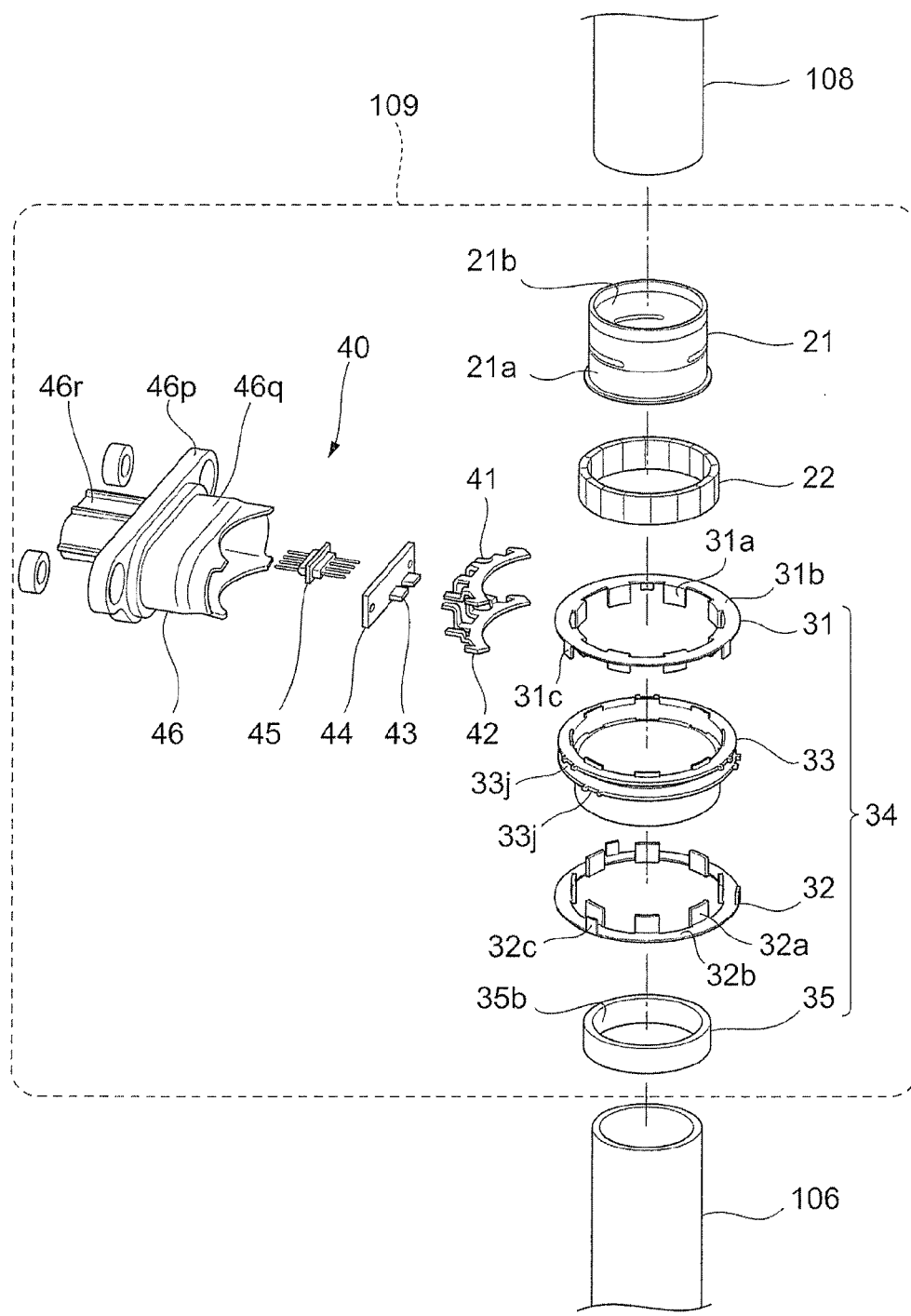
FIG. 2 is an exploded perspective view showing a configuration of a torque sensor (an example of a torque detector) according to the embodiment of the present invention.
Figure 3:
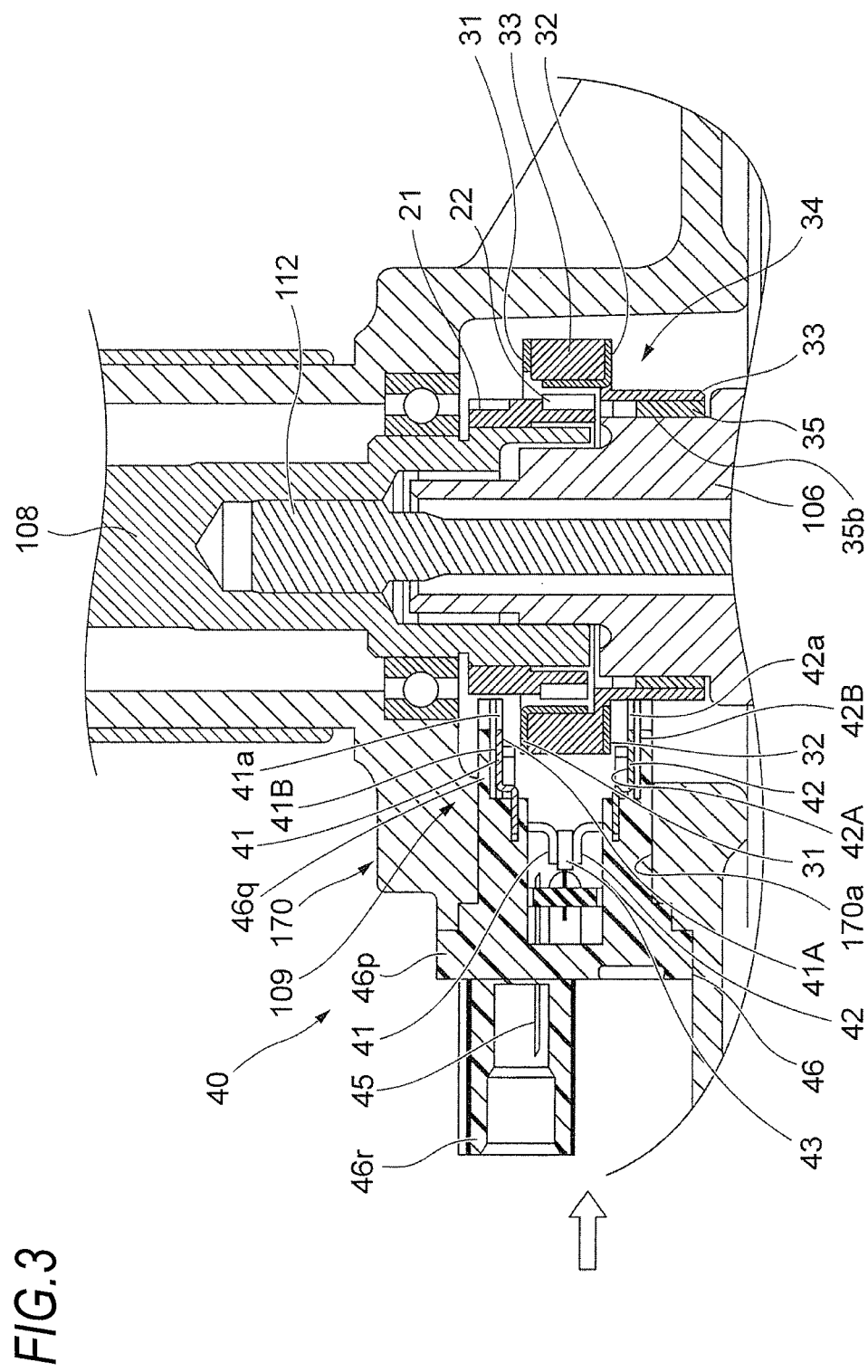
FIG. 3 is a sectional view showing the arrangement of the torque sensor.

FIG. 2 is an exploded perspective view showing a configuration of the torque sensor 109, and FIG. 3 is a sectional view showing the arrangement of the torque sensor 109. As shown in FIG. 2, the torque sensor 109 includes a magnet collar 21 and a permanent magnet 22 (examples of a magnet) that are fixed to the lower connection shaft 108 which is an input shaft, a first stator 31 (an example of a stator), a second stator 32 (an example of a stator), a stator holder 33 (an example of a stator holing member) and a yoke 35 that are fixed to the pinion shaft 106 which is an output shaft, and a sensor unit 40 that collectively attracts magnetic fluxes guided by the first stator 31 and the second stator 32, and outputs an electric signal according to the relative rotation angle between the lower connection shaft 108 and the pinion shaft 106.

The first stator 31, the second stator 32, the stator holder 33, and the yoke 35 fixed to the pinion shaft 106 are integrally configured as a unit. This integrally configured unit is hereinafter referred to as a stator unit 34.

(Configuration of Input Shaft Side: Permanent Magnet 22, Etc.)

The permanent magnet 22 is formed in a ring shape by alternately arranging N poles and S poles in a circumferential direction, and is magnetized in the circumferential direction. In the permanent magnet 22 according to this embodiment, eight N poles and eight S poles of the same size are disposed at equal angles.

The magnet collar 21 is formed from an iron material in a cylindrical shape, and the permanent magnet 22 is fitted around the outer peripheral surface 21a, and, for example, the permanent magnet 22 is fixed to the magnet collar 21 by adhesion. As shown in FIG. 2, the lower connection shaft 108 is inserted into the inner peripheral surface 21b of the magnet collar 21, and the magnet collar 21 is fixed to the lower connection shaft 108 by press fitting, welding, caulking, or the like. Consequently, the permanent magnet 22 is rotatable about the shaft, integrally with the lower connection shaft 108.

(Configuration of Output Shaft Side: Stator Unit 34)

The first stator 31 and the second stator 32 are formed by soft magnetic materials such as permalloy. As shown in FIG. 2, the first stator 31 has an annular part 31b that is formed in an annular shape. The first stator 31 further has eight stator claws 31a that protrude and extend from the inner peripheral edge of the annular part 31b in the axial direction of the lower connection shaft 108, and are arranged in the circumferential direction. These eight stator claws 31a are formed in the circumferential direction at equal angular intervals (intervals of 45 degrees).

Additionally, the first stator 31 has three protruding pieces 31c that protrude and extend from the outer peripheral edge of the annular part 31b in the axial direction of the lower connection shaft 108. These three protruding pieces 31c are formed in the circumferential direction at equal angular intervals (intervals of 120 degrees). Each protruding piece 31c is radially inwardly pressed by a tool or the like, to be plastically deformed, and is positioned and caulked to a positioning part 33j of the stator holder 33, so that the first stator 31 is connected to the stator holder 33.

The second stator 32 is the same as the first stator 31 that is arranged to be tuned upside down in the figure, and an annular part 32b, stator claws 32a, and protruding pieces 32c correspond to the annular part 31b, the stator claws 31a, and the protruding pieces 31c of the first stator 31, respectively.

Similarly to the first stator 31, the second stator 32 is caulked to the positioning part 33j of the stator holder 33, so that the second stator 32 is connected to the stator holder 33.

The stator claws 31a of the first stator 31 and the stator claws 32a of the second stator 32 that are positioned and fixed to the stator holder 33 are alternately arranged in the circumferential direction at equal angular intervals.

The yoke 35 is formed from, for example, an iron material in a short cylindrical, and formed integrally with the substantially cylindrical resin stator holder 33 by insert molding.

The stator holder 33 is formed in a substantially cylindrical shape by a nonmagnetic material. With the first stator 31 and the second stator 32 being connected to the stator holder 33, the stator unit 34 that includes the yoke 35 is configured.

As shown in FIG. 3, the pinion shaft 106 is inserted into the inner peripheral surface 35b of the yoke 35, and the stator unit 34 is fixed to the pinion shaft 106 by press fitting, welding, caulking, or the like.

Herein, the stator unit 34 is fixed to the pinion shaft 106 such that the circumferential center line of each of the stator claws 31a and 32a of the stator unit 34 fixed to the pinion shaft 106 coincide with a boundary line between the N poles and the S poles of the permanent magnet 22 fixed to the lower connection shaft 108, in a state where the steering torque T does not act on the torsion bar 112 (relative rotation does not occur between the lower connection shaft 108 and the pinion shaft 106).

As shown in FIG. 3, the magnet collar 21 and the permanent magnet 22 on the input shaft side, and the stator unit 34 on the output shaft side are covered with a housing 170.

(Configuration of Sensor Unit 40)

Figure 4:
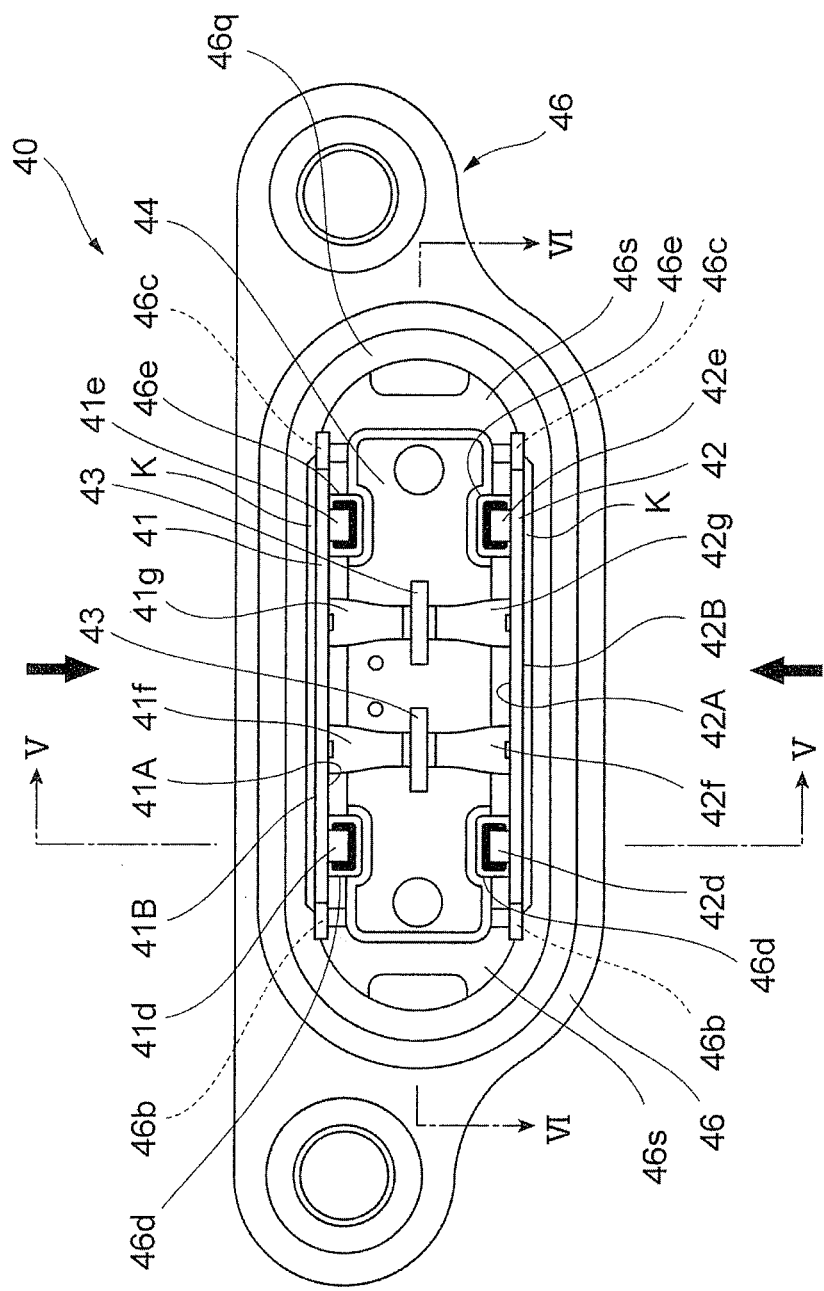
FIG. 4 is a front view of a sensor unit.
Figure 5:
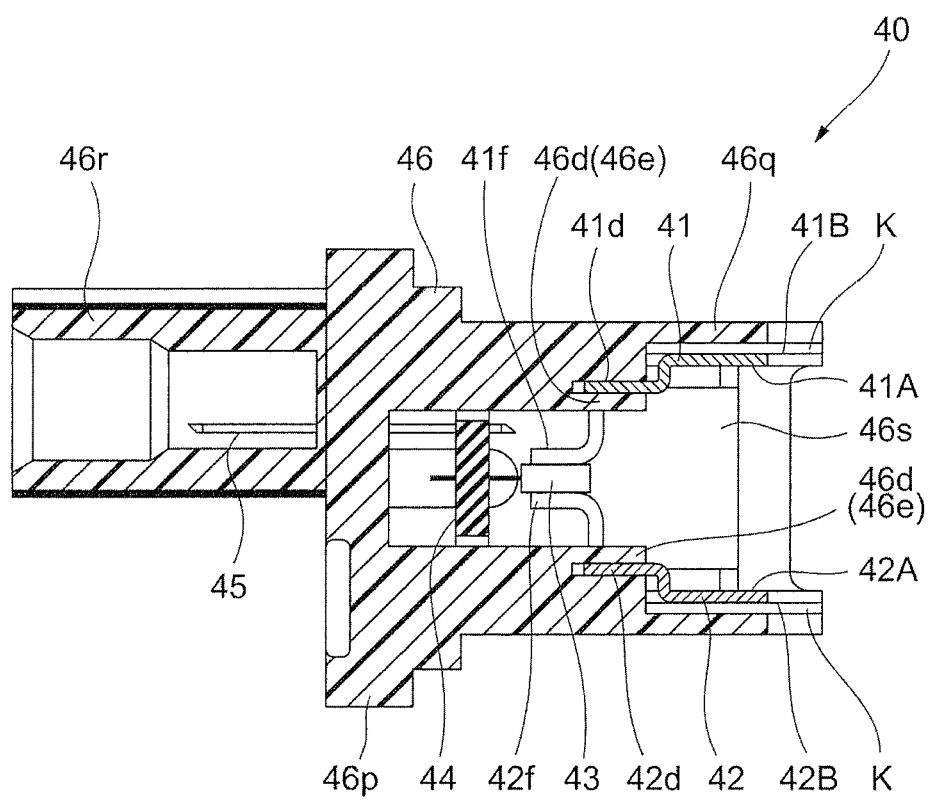
FIG. 5 is a sectional view showing a section taken along the line V-V in FIG. 4.
Figure 6:
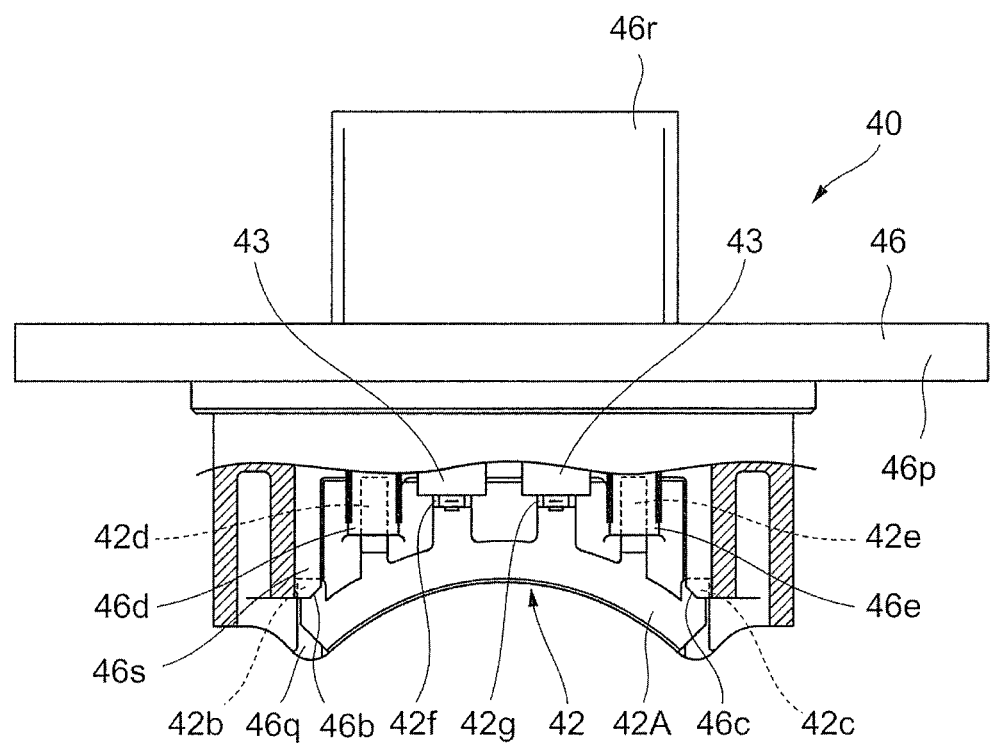
FIG. 6 is a partial sectional view showing a part of a section taken along the line VI-VI in FIG. 4.

FIG. 4 is a front view of the sensor unit 40, FIG. 5 is a sectional view showing a section taken along the line V-V in FIG. 4, and FIG. 6 is a partial sectional view showing a part of a section taken along the line VI-VI in FIG. 4.

The sensor unit 40 includes a first collector 41, a second collector 42, magnetometric sensors 43, a substrate 44, a sensor housing 46, and a terminal 45 (see FIG. 5).

Sensor Housing 46

The sensor housing 46 is formed of, for example, a polyphenylene sulfide (PPS) resin material, or a polybutylene terephthalate (PBT) resin material. As shown in FIGS. 2 and 3, the sensor housing 46 has a base 46p, a long cylindrical peripheral wall 46q (an example of a wall) that rises from the base 46p, and a connecting part 46r that is formed on an opposite side to the peripheral wall 46q with the base 46p therebetween.

The first collector 41, the second collector 42, the substrate 44, and the terminal 45 are housed in a space surrounded by the base 46p and the peripheral wall 46q of the sensor housing 46, and held by the sensor housing 46, as shown in FIG. 5. That is, the peripheral wall 46q serves as a wall that covers the outside of the first collector 41 and the second collector 42.

As shown in FIG. 3, in the sensor unit 40, the peripheral wall 46q is guided by the hole 170a of the housing 170 and inserted into the hole 170a in an arrow direction shown in the figure, and the base 46p is fixed to the housing 170 by a fastening member (not shown).

In the sensor housing 46, first protruding parts 41b and 41c (see FIG. 7) of the first collector 41 described later are press-fitted, so that first support parts 46b and 46c (see FIG. 6) which support the first protruding parts 41b and 41c are formed, and second protruding parts 41d and 41e (see FIG. 7) are press-fitted, so that second support parts 46d and 46e (see FIG. 4) which support the second protruding parts 41d and 41e are formed.

Additionally, in the sensor housing 46, first protruding parts 42b and 42c (see FIG. 7) of the second collector 42 are press-fitted, so that the first support parts 46b and 46c (see FIG. 6) which support the first protruding parts 42b and 42c are formed, and second protruding parts 42d and 42e (see FIG. 7) are press-fitted, so that the second support parts 46d and 46e (see FIG. 4) which support the second protruding parts 42d and 42e are formed.

Herein, the first support parts 46b and 46c are each formed by a clearance between the peripheral wall 46q, and a support member 46s formed in a space inside the peripheral wall 46q.

In a range between the first support parts 46b and 46c of the peripheral wall 46q, the inner peripheral surface of the peripheral wall 46q is formed in a recessed shape.

First Collector 41 and Second Collector 42

Figure 7:
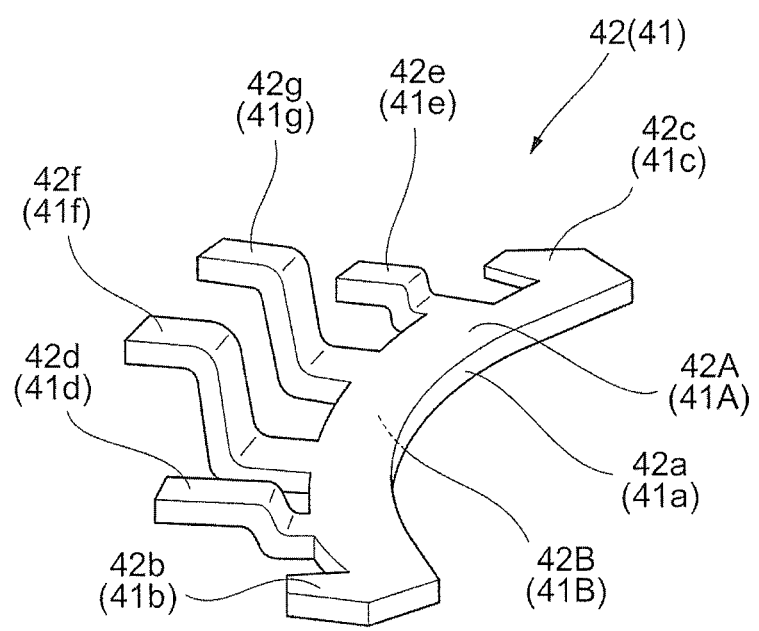
FIG. 7 is a perspective view showing a second collector.

FIG. 7 is a perspective view showing the second collector 42. As shown in FIG. 7, the second collector 42 is formed in a shape having an arc part 42a formed in a flat plate shaped arc, and the first protruding parts 42b and 42c, the second protruding parts 42d and 42e, and third protruding parts 42f and 42g which externally extend from the outer peripheral edge of the arc part 42a.

The arc part 42a is formed in a shape corresponding to an arc that is a part of the annular part 32b (see FIG. 2) of the second stator 32. The arc part 42a is arranged to face the annular part 32b of the second stator 32 with a void therebetween in a state where the sensor housing 46 is fixed to the housing 170, and collectively attracts a magnetic flux guided by the second stator 32.

The first protruding parts 42b and 42c are formed on the both ends in the longitudinal direction of the second collector 42 to extend on the same plane with the arc part 42a. The first protruding parts 42b and 42c are press-fitted in the first support parts 46b and 46c of the sensor housing 46 and supported by these support parts.

The second protruding parts 42d and 42e are formed at an inner position in the circumferential direction with respect to the first protruding parts 42b and 42c. The second protruding parts 42d and 42e are formed by bending so as to have steps from a surface 42A (hereinafter, referred to as a facing surface 42A), facing the annular part 31b of the second stator 32, of the arc part 42a upward in the figure. The second protruding parts 42d and 42e are press-fitted in the second support parts 46d and 46e of the sensor housing 46 at parts on the protruding tip side, to be supported.

The third protruding parts 42f and 42g are formed at further inner positions in the circumferential direction with respect to the second protruding parts 42d and 42e. The third protruding parts 42*f* and 42*g* are formed by bending so as to have steps, which are larger than those of the second protruding parts 42*d* and 42*e*, from the facing surface 42A of the arc part 42*a* upward in the figure. The third protruding parts 42*f* and 42*g* come into contact with the magnetometric sensors 43 since each of these protruding parts has a stepped part, and guide the magnetic flux collectively attracted by the arc part 42*a*, to the magnetometric sensors 43.

As shown in FIG. 2, the configurations of the first collector 41 and the second collector 42 are the same except that the arrangement postures thereof are upside down from each other, and the first collector 41 has the same configuration as the second collector 42. Accordingly, as shown by the reference numerals in parentheses of FIG. 7, an arc part 41*a*, the first protruding parts 41*b* and 41*c*, the second protruding parts 41*d* and 41*e*, third protruding parts 41*f* and 41*g*, and the facing surface 41A in the first collector 41 correspond to the arc part 42*a*, the first protruding parts 42*b* and 42*c*, the second protruding parts 42*d* and 42*e*, the third protruding parts 42*f* and 42*g*, and the facing surface 42A in the second collector 42, respectively.

The arc part 41*a* is arranged to face the annular part 31*b* (see FIG. 2) of the first stator 31 with a void therebetween in a state where the sensor housing 46 is fixed to the housing 170, and collectively attracts a magnetic flux guided by the first stator 31.

In the first collector 41, the first protruding parts 41*b* and 41*c*, and the second protruding parts 41*d* and 41*e* are press-fitted in the first support parts 46*b* and 46*c*, and the second support parts 46*d* and 46*e* of the sensor housing 46, thereby being held by the sensor housing 46.

In a state where the first collector 41 is held by the sensor housing 46, a clearance K is formed between a surface 41B opposite to the facing surface 41A of the first collector 41 (hereinafter, referred to as an opposite surface 41B), and the peripheral wall 46*q*, except the first protruding parts 41*b* and 41*c* that are the both ends in the longitudinal direction of the first collector 41, as shown in FIG. 4.

The longitudinal direction of the first collector 41 can be paraphrased as the circumferential direction of the first stator 31 that faces the first collector 41.

Similarly, in a state where the second collector 42 is held by the sensor housing 46, a clearance K is formed between a surface 41B opposite to the facing surface 42A of the second collector 42 (hereinafter, referred to as an opposite surface 42B), and the peripheral wall 46*q*, except the first protruding parts 42*b* and 42*c* that are the both ends in the longitudinal direction of the second collector 42, as shown in FIG. 4. The longitudinal direction of the second collector 42 can be also paraphrased as the circumferential direction of the second stator 32 that faces the second collector 42.

Magnetometric Sensors 43

The magnetometric sensors 43 perform conversion to an electric signal corresponding to magnetic flux density between the first collector 41 and the second collector 42, on the basis of the magnetic fluxes guided by the first collector 41 and the second collector 42.

The substrate 44 includes a processing circuit, and the processing circuit performs a process to the electric signal output from the magnetometric sensors 43.

The terminal 45 passes through the base 46*p* from the substrate 44, and extends to the connecting part 46*r* (see FIG. 5), and the electric signal processed by the processing circuit of the substrate 44 is guided to the side of the connecting part 46*r*.

A connector of an electric wire (not shown) is connected to the connecting part 46*r*, and the electric signal processed by the processing circuit of the substrate 44 is input to the controller 10 (see FIG. 1) from the terminal 45 through the electric wire.

Action of Torque Sensor 109

According to the torque sensor 109 that is configured as described above, when the steering torque T is applied to the torsion bar 112, torsion occurs in the torsion bar 112, and the lower connection shaft 108 and the pinion shaft 106 relatively rotate, the respective center lines in the circumferential direction of the stator claws 31*a* and 32*a* are deviated to the N pole side or the S pole side of the permanent magnet 22. According to this deviated angle, the amount of the magnetic flux guided to each of the first stator 31 and the second stator 32 is changed.

The magnetic flux guided to the annular part 31*b* of the first stator 31 is collectively attracted by the arc part 41*a* of the first collector 41 that faces the annular part 31*b*, and is guided to the magnetometric sensors 43 from the third protruding parts 41*f* and 41*g*.

Similarly, the magnetic flux guided to the annular part 32*b* of the second stator 32 is collectively attracted by the arc part 42*a* of the second collector 42 that faces the annular part 32*b*, and is guided to the magnetometric sensors 43 from the third protruding parts 42*f* and 42*g*.

The respective magnetometric sensors 43 perform conversion to electric signal according to the amounts of the respective magnetic fluxes guided from the third protruding parts 41*f* and 41*g* of the first collector 41 and the third protruding parts 42*f* and 42*g* of the second collector 42, namely to an electric signal corresponding to the relative rotation angle between the lower connection shaft 108 and the pinion shaft 106.

The substrate 44 causes the processing circuit to convert the electric signal to an electric signal corresponding to the steering torque T, and to output the converted electric signal to the controller 10 from the terminal 45 through the electric wire.

Effects of Embodiment

The sensor unit 40 of this embodiment is arranged as a part of the electric power steering device 100, for example, in the engine room of the vehicle. In this case, the sensor unit 40 is likely to receive heat from the engine or the like. When the sensor housing 46 formed of a resin material in the sensor unit 40 receives heat, the peripheral wall 46*q* may be deformed inwardly as shown by the arrow in FIG. 4.

According to the electric power steering device 100, the torque sensor 109, and the sensor unit 40 of this embodiment, the respective clearances K are formed between the opposite surface 41B of the first collector 41 and the peripheral wall 46*q*, and between the opposite surface 42B of the second collector 42 and the peripheral wall 46*q*.

Therefore, even when the peripheral wall 46*q* is deformed inwardly, the peripheral wall 46*q* deformed inwardly stays in the clearances K, and does not press the arc part 41*a* of the first collector 41 and the arc part 42*a* of the second collector 42 inwardly.

Accordingly, even in a case where the peripheral wall 46*q* is deformed by heat, a distance between the arc part 41*a* of the first collector 41 and the annular part 31*b* of the first stator 31 and a distance between the arc part 42a of the second collector 42 and the annular part 32b of the second stator 32 do not vary.

That is, unlike this embodiment, in a case where the clearances K are not formed between the opposite surface 41B of the first collector 41 and the peripheral wall 46q, and between the opposite surface 4213 of the second collector 42 and the peripheral wall 46q, the peripheral wall 46q deformed inwardly presses the arc part 41a of the first collector 41 and the arc part 42a of the second collector 42 inwardly. In this case, the distance between the arc part 41a of the first collector 41 and the annular part 31b of the first stator 31 and the distance between the arc part 42a of the second collector 42 and the annular part 32b of the second stator 32 shorten compared to a case where the peripheral wall 46q does not press. As a result, the amounts of magnetic fluxes collectively attracted by the first collector 41 and the second collector 42 are larger than the amounts of magnetic fluxes collectively attracted in a case where the peripheral wall 46q does not press, and errors occur in the results detected by the magnetometric sensors 43.

However, according to the sensor unit 40, the torque sensor 109, and the electric power steering device 100 of this embodiment, it is possible to prevent or suppress an influence by heat without variation of the amounts of the magnetic fluxes collectively attracted by the first collector 41 and the second collector 42, even when the sensor housing 46 receives heat.

Even when the sensor housing 46 is deformed by heat, a deformed amount thereof is reduced as the sensor housing 46 gets close to the ends in the width direction of the sensor housing 46 (corresponding to the width directions of the first collector 41 and the second collector 42). This is because the peripheral wall 46q is formed to bend in an arc shape, and therefore the ends in the width direction have higher rigidity than parts other than the ends in the width direction (central parts in the width direction, for example).

Accordingly, the clearances K should be formed in ranges except the both ends in the longitudinal directions of the first collector 41 and the second collector 42 where the deformed amount of the peripheral wall 46q is less. Consequently, the first protruding parts 41b and 41c and the first protruding parts 42b and 42c corresponding to the both ends in the longitudinal directions of first collector 41 and the second collector 42 can be supported by the first support parts 46b and 46c on the leading end side of the peripheral wall 46q, respectively, and it is possible to accurately maintain the distance between the arc part 41a of the first collector 41 and the annular part 31b of the first stator 31, and the distance between the arc part 42a of the second collector 42 and the annular part 32b of the second stator 32.

In this embodiment, the sensor housing 46 has the peripheral wall 46q that covers the entire outer peripheries of the first collector 41 and the second collector 42. However, the wall of the sensor housing in the present invention is not limited to the peripheral wall that is connected in the circumferential direction.

That is, the sensor housing may be a wall having a part that externally covers at least the surface 41B (opposite surface 41B) opposite to the surface 41A (facing surface 41A), facing the first stator 31, of the first collector 41, and a wall having a part that externally covers at least the surface 42B (opposite surface 42B) opposite to the surface 42A (facing surface 42A), facing the second stator 32, of the second collector 42.

Modifications

The sensor unit 40 according to the above embodiment is formed such that parts except parts, in contact with the both ends of the first collector 41 and the second collector 42, of the peripheral wall 46q of the sensor housing 46 are formed in the recessed shapes, so that the clearances K are formed between the first and second collectors 41 and 42, and the peripheral wall 46q. However, the present invention is not limited to this form.

Figure 8:
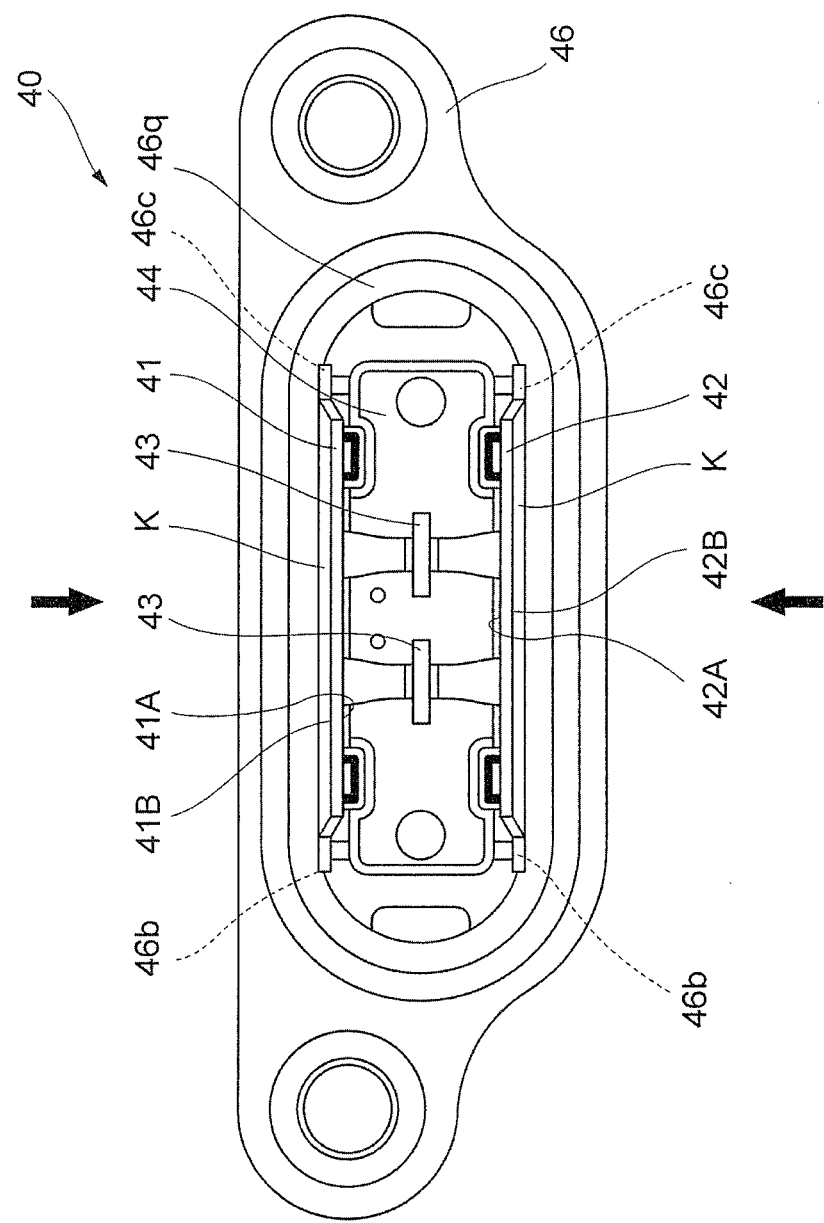
FIG. 8 is a front view showing a sensor unit according to another embodiment.

That is, for example, as shown in FIG. 8, parts except the both ends of the first collector 41 and the second collector 42 may be formed by bending in a direction away from the peripheral wall 46q, thereby forming the clearances K between the opposite surfaces 41B and 42B of the first and second collectors 41 and 42, and the peripheral wall 46q.

Also by the sensor unit 40 configured in this form, it is possible to exert an effect identical to that of the sensor unit 40 of the above embodiment.

In the above each embodiment, the sensor unit 40 includes two magnetometric sensors 43. However, the sensor unit, the torque detector, and the electric power steering device according to the present invention are not limited to this form, and the number of magnetometric sensors to be included may be one.

The electric power steering device 100 of each of the above embodiments is of a so-called pinion assist type. However, the electric power steering device of the present invention is not limited to this type, and may be of a so-called column assist type or rack assist type.

What is claimed is:

1. A sensor unit comprising:
a collector that faces a stator guiding a magnetic flux, with a void between the collector and the stator, and collectively attracts the magnetic flux guided by the stator; and
a sensor housing that has a wall covering outside of the collector, and holds the collector, wherein
a clearance is formed between an opposite surface of the collector to a surface thereof facing the stator, and the wall of the sensor housing,
the collector has two ends in a longitudinal direction thereof which contact the wall of the sensor housing, and
the clearance is formed along a length of the collector in the longitudinal direction except for the two ends of the collector.

2. The sensor unit according to claim 1, wherein the sensor housing includes a longitudinally extending slot that receives a protruding portion of the collector.

3. The sensor unit according to claim 1, wherein
a part except parts, which are in contact with the two ends of the collector, of the wall is formed in a recessed shape, which results in forming the clearance.

4. The sensor unit according to claim 1, wherein
a part except the two ends of the collector is formed by bending in a direction away from the wall, which results in forming the clearance.

5. A torque detector comprising:
a magnet that is fixed to one shaft of two shafts which relatively rotate and are coaxially arranged;
a stator that is fixed to the other shaft of the two shafts, and guides a magnetic flux according to a torsion angle between the one shaft and the other shaft; and
a sensor unit that comprises
a collector that faces the stator, with a void between the collector and the stator, and collectively attracts the magnetic flux guided by the stator, and
a sensor housing that has a wall covering outside of the collector, and holds the collector, wherein a clearance is formed between an opposite surface of the collector to a surface thereof facing the stator, and the wall of the sensor housing the collector has two ends in a longitudinal direction thereof which contact the wall of the sensor housing, and the clearance is formed along a length of the collector in the longitudinal direction except for the two ends of the collector.

6. An electric power steering device comprising:

a torque detector detecting torque, that includes:

a magnet that is fixed to one shaft of two shafts which relatively rotate and are coaxially arranged;

a stator that is fixed to the other shaft of the two shafts, and detects a magnetic flux according to a torsion angle between the one shaft and the other shaft; and a sensor unit that includes a collector that faces the stator, with a void between the collector and the stator, and collectively attracts the magnetic flux detected by the stator, and a sensor housing that has a wall covering outside of the collector, and holds the collector;

an electric motor that assists rotation of one of the one shaft and the other shaft; and a controller that controls driving of the electric motor on the basis of a result detected by the torque detector, wherein a clearance is formed between an opposite surface of the collector to a surface thereof facing the stator, and the wall of the sensor housing, the collector has two ends in a longitudinal direction thereof which contact the wall of the sensor housing, and the clearance is formed along a length of the collector in the longitudinal direction except for the two ends of the collector.

7. The sensor unit according to claim 1, further comprising:

another collector that faces the stator guiding a magnetic flux, with another void between the other collector and the stator, and collectively attracts the magnetic flux guided by the stator, wherein the other collector is provided in another side across from the stator.

8. The sensor unit according to claim 1, wherein the collector includes an arc part having a central angle that is less than 180 degrees.

9. The sensor unit according to claim 1, wherein the collector has at least one protruding portion that externally extends from the outer peripheral edge of the arc part.

10. The sensor unit according to claim 2, wherein the protruding portion of the collector is press-fitted into the longitudinally extending slot.

\* \* \* \* \*